United States Patent Office 3,074,851
Patented Jan. 22, 1963

3,074,851
FRACTIONATION OF PROTEIN SOLUTIONS
Maximilian Knedel, Schönchenstrasse 25,
Munich, Germany
No Drawing. Filed Dec. 2, 1958, Ser. No. 777,565
7 Claims. (Cl. 167—78)

This invention relates to a method of fractionating protein solutions, and more particularly to the fractionation of protein solutions of human, animal and vegetable origin.

The isolation of protein fractions is of considerable importance for medical science and particularly for such purposes as the production of substitute products and immunizing preparations. For example, various protein substances, such as gamma globulins, have been recognized as carriers of antibodies against a variety of diseases; hence, they are used as supplements to the primary therapy in the treatment of infections in patients who exhibit a low resistance against the particular infectious diseases due to an insufficient concentration of antibodies in the blood stream. Furthermore, such protein substances are of importance in the prophylaxis of hepatitis and other virus diseases, such as measles, scarlet fever and the like. They are also useful as a means for artificially supplying globulins in cases of a γ-globulinemia, i.e. complete absence of gamma-globulins in the blood, caused by disease. Moreover, the possibility of isolating protein substances for chemical analysis represents a considerable scientific advance.

A number of processes for fractionating protein solutions or isolating proteins, such as gamma-globulins, are already known (Kirk-Othmer, Encyclopedia of Chemical Technology, vol. 2, pp. 559–571). In accordance with these known processes, biological protein solutions, such as human and animal blood serum, pleural exudate, ascites and the like, as well as protein solutions of plant origin are fractionated by adding thereto ammonium sulfate solutions, ether, ethanol and acetone in varying concentrations, or by means of ion exchangers. However, the first precipitations in these known processes generally do not yield pure protein fractions; multi-step precipitation procedures, coupled with a careful choice of the precipitation agents, and adjustment of their concentrations, are required to isolate the protein fractions in pure form. In a few of these known processes it is even necessary to maintain definite temperatures and/or to add certain ions. Hence, the isolation of certain pure protein fractions, particularly of gamma-globulins and albumin-free beta/gamma-globulin mixtures, has heretofore been possible only by means of complicated, multi-step and time-consuming methods.

It is an object of the present invention to provide a simple, one-step process for the isolation of substantially pure protein fractions from protein solutions, which requires but a single precipitating agent.

Other objects and advantages of the present invention will become apparent as the description proceeds.

I have found that protein fractions, such as an electrophoretically uniform gamma-globulin fraction or an albumin-free beta/gamma-globulin mixture, can be obtained in a single-step procedure by admixing certain quinoline derivatives with solutions containing such protein substances. Thus, the process according to the present invention for the fractionation of protein solutions comprises broadly adding a quinoline derivative, preferably in the form of an aqueous solution, to the protein solution.

The quinoline derivatives suitable for this purpose are preferably compounds having the general structural formula

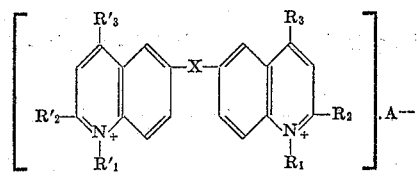

wherein X is a bivalent group containing at least two nitrogen atoms, such as the ureido radical.

—NH—CO—NH— the aminoacetic acid amide radical

—NH—CO—CH$_2$—NH— the malonic acid diamide radical

—NH—CO—CH$_2$—CO—NH— or the 2,4,6-triaminotriazine radical

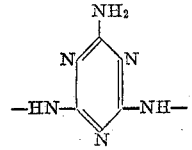

the group being attached to the quinolyl radicals through two of the nitrogen atoms, $R_1$, $R'_1$, $R_2$, $R'_2$, $R_3$ and $R'_3$ are hydrogen or lower alkyl radicals or unsubstituted or substituted amino groups and $A^{--}$ represents two monovalent anions or a bivalent anion. However, the phosphates, that is the corresponding salts with trivalent anions, may also be used.

The following are specific examples of quinoline derivatives which are preferably used for the fractionation of protein solutions in accordance with the present invention: N,N'-di-(2-methyl-4-aminoquinolyl-6)-ureido-dihydrochloride having the structural formula

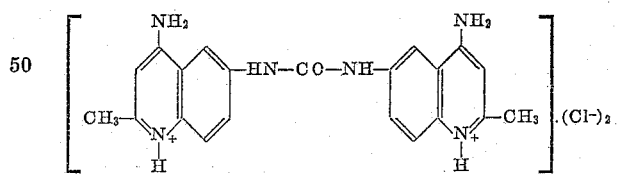

N,N'-di-(2-methyl-4-aminoquinolyl-6) - ureido - dichloromethylate having the structural formula

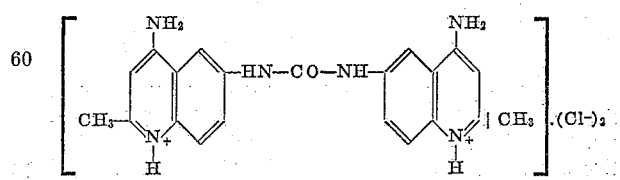

and N,N'-di-(2-methyl-4-aminoquinolyl-6) - aminoacetic acid amide-dihydrochloride having the structural formula

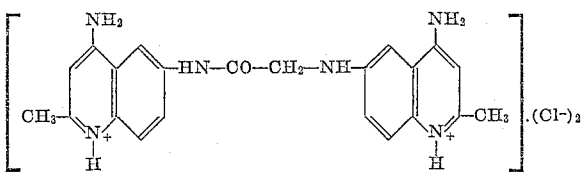

N,N'-di-(2-methyl-4-aminoquinolyl-6)-malonic acid diamide-dihydrochloride

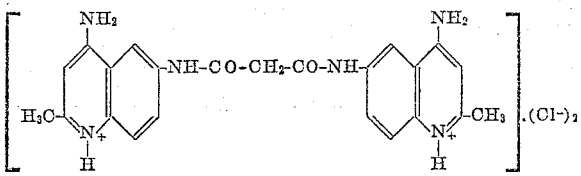

N-(2-aminoquinolyl-6) - N'-quinolyl - ureido - dihydrochloride

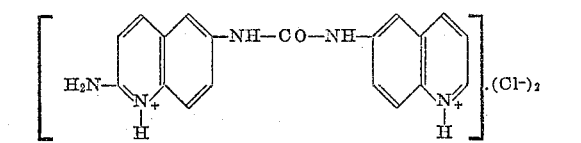

di-(2-methyl-4-aminoquinolyl-6)-triamino-triazine sulfate

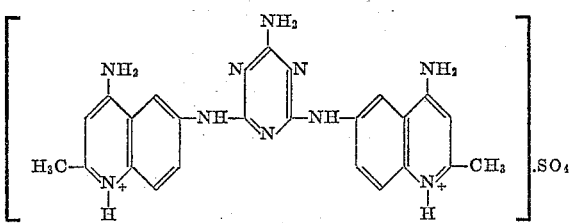

The quinoline derivatives are used for the fractionation process according to the present invention in the form of solutions, and preferably in the form of aqueous solutions. The concentration of the quinoline derivative in these solutions may range from 0.1 to 1.0% by weight, but it is preferably about 0.4% by weight.

The amount of quinoline derivative solution to be added to the protein solution to be fractionated depends largely upon the degree and type of fractionation desired. For example, the isolation of a substantially pure gamma-globulin fraction is achieved by the addition of about 36 parts by weight of a 0.4% aqueous solution of N,N'-di-(2-methyl-4-aminoquinolyl-6)-ureido-dihydrochloride to 10 parts by weight of human blood serum. On the other hand, by adding from about 24 to about 32 parts by weight of this solution to 10 parts by weight of human blood serum, a beta/gamma globulin mixture is obtained. The addition of still smaller amounts of the aqueous solution to 10 parts of human blood serum will fractionate the serum into a mixture consisting of albumin and alpha-, beta- and gamma-globulins.

The process according to the present invention is particularly suitable for the fractionation of biological protein solutions, such as human and animal blood sera, pleural exudates, ascites, as well as protein solutions of plant or vegetable origin.

The operability of the process according to the invention is substantially independent of the temperature of either the albumin solution or the solution of the quinoline derivative. Hence, the process may be carried out at any desired temperature between the freezing points of the solutions and the decomposition temperature of the proteins.

The pH-value of the solution of the quinoline derivative has also little effect upon the operability of the process, but it is preferred if the pH of the quinoline derivative solution is between about 5.7 and 1.9. If the pH is below 1.9, the precipitated protein fractions go back into solution, whereas if the pH is within the alkaline range the quinoline derivative precipitates out.

The employment of the process according to the present invention in the production of pure gamma-globulin produces gamma-globulin of up to 100% purity with yields up to 97% of theory in a single-step operation. The process does not alter the biological properties of the gamma-globulin isolated thereby, as shown by measurements of its electrophoretic mobility, its ultraviolet absorption spectrum, its viscosity, its behavior in the ultra-centrifuge and by immunological tests.

As already pointed out, varied fractionation results are achieved depending upon the quantity of fractionating agent employed. However, in addition thereto and in contrast to previously known processes of this type, the present process makes it possible to isolate simultaneously beta- and gamma-globulins while the other plasma proteins are precipitated and may thus be readily separated.

The process according to the present invention may, of course, also be used as in intermediate step in one of the known plasma fractionation processes or in combination with other physio-chemical methods.

On the other hand, the precipitates obtained in the process according to the present invention may also be redissolved, and the solutions thus obtained may then be further fractionated by known methods.

The following examples will further illustrate the present invention and will enable others skilled in the art to understand it more completely.

EXAMPLE I

*Isolation of a Gamma-Globulin Fraction From Human Blood Serum*

STARTING MATERIALS AND REAGENTS (1) *Serum.*—The blood serum used as the starting material was obtained from sober subjects. A sufficient amount of blood was drawn off by vein puncture. After coagulation and retraction the plasma was decanted and then centrifuged. The liquid centrifugate was used for fractionation process. The composition of the blood serum thus obtained was determined electrophoretically in accordance with the method of Grassmann et al., Deutsche Medizinische Wochenschrift, vol. 76 (1951), p. 333. The protein fraction distribution was found to be as follows:

|  | Percent |
|---|---|
| Albumin | 58.2 |
| Globulins: |  |
|     Alpha 1 | 3.7 |
|     Alpha 2 | 7.2 |
|     Beta | 12.8 |
|     Gamma | 18.1 |
| Total protein content | 7.18 |

(2) *Fractionating agent.*—N,N'-di-(2-methyl-4-aminoquinolyl-6)-ureido-dihydrochloride. A 0.4% solution of this compound in double-distilled water was prepared, which was used in its freshly prepared state.

(3) *Fractionation procedure.*—Exactly 5.0 ml. of the serum obtained in 1 above were filled from a pipette into each of five Erlenmeyer flasks having a capacity of 50 ml. each. Thereafter, the quantities of fractionating agent solution shown in the table below were added to the serum in each flask from a slowly dripping pipette or burette, while shaking the flasks. This procedure was carried out at room temperature. An increasing white turbidity developed in the serum samples which finally assumed a milky appearance. The substrates were filled into separate centrifuging glasses and were centrifuged for 10 minutes at 3000 r.p.m. The contents of each glass thereby divided into a precipitate and a sharply separated liquid layer above the precipitate. The liquid layer was separated from the precipitate and was subjected to electrophoresis. The following protein distribution was found:

| Flask No. | Serum, ml. | Fractionating Agent Solution, ml. | Serum Albumin, Percent | Serum Globulins, Percent | | | |
|---|---|---|---|---|---|---|---|
| | | | | α1 | α2 | β | γ |
| 1 | 5 | 10 | 21.3 | 8.9 | 23.3 | 46.5 | |
| 2 | 5 | 12 | | | 32.4 | 67.6 | |
| 3 | 5 | 14 | | | 28.2 | 71.9 | |
| 4 | 5 | 16 | | | 13.3 | 86.7 | |
| 5 | 5 | 18 | | | | 100.0 | |

The gamma-globulin fraction from flask No. 5 was found to be electrophoretically pure.

EXAMPLE II (A) *Isolation of a Beta/Gamma-Globulin Fraction From Human Blood Serum*

STARTING MATERIAL AND FRACTIONATION REAGENT (1) *Serum.*—Same as in Example I.
(2) *Fractionation reagent.* — N,N'-di-(2-methyl-4-amino-quinolyl-6)-ureido-dichloromethylate. A freshly prepared 0.4% by weight solution of this compound in double-distilled water was used.

(3) *Fractionation procedure.*—10 ml. serum were placed into an Erlenmeyer flask and 28 ml. of the fractionation agent solution were added dropwise thereto while continuously shaking the flask. A milky turbidity developed in the serum. The substrate was placed into centrifuge glasses and was then centrifuged for 10 minutes at 3000 r.p.m., whereby it divided into a precipitate and a sharply separated clear liquid layer above the precipitate. The liquid phase was siphoned off, and a small quantity thereof was subjected to electrophoretic examination. The following globulin content was found:

| | Percent |
|---|---|
| Beta-globulin | 31.7 |
| Gamma-globulin | 68.3 |

The beta/gamma-globulin fraction thus obtained was free from serum albumin, alpha 1-globulin and alpha 2-globulin; that is, it contained less than 0.1% serum albumin and less than 0.2% high-molecular alpha 2-globulin (method of determination according to Ouchterlony, Acta Pathol. Microbiol. Scand., vol. 25 (1948), page 186).

(B) *Isolation of a Beta-Globulin Fraction From Human Blood Serum With the Above-Described Method as an Intermediate Step*

The procedure described under (A) above was followed for the separation of the beta/gamma-globulin fraction. Thereafter, the beta-globulin fraction of this mixture was isolated with the aid of the preparative discontinuous electrophoresis method according to Knedel, Verhandlungen der Deutschen Gesellschaft fur innere Medizin, vol. 61 (1955). Electrophoretic examination of the globulin fraction thus obtained showed that it consisted entirely of 100% beta-globulin.

EXAMPLE III

*Fractionation of Human Blood Serum*

The procedure used in this case was basically the same as that described in Examples I and II.

(a) STARTING MATERIAL AND FRACTIONATION AGENT (1) *Serum.*—Same as in Example I.
(2) *Fractionation agent.*—N,N'-di-(2-methyl-4-amino-quinolyl-6)-aminoacetic acid amide-dihydrochloride. A freshly prepared 0.3% by weight solution of this compound in double-distilled water was used.

(b) FRACTIONATION PROCEDURE

Essentially the same procedure was used as in Example I, except that only three Erlenmeyer flasks were used. The following results were obtained:

| Flask No. | Serum, ml. | Fractionation Agent Added, ml. | Albumin, Percent | Globulins, Percent | | | |
|---|---|---|---|---|---|---|---|
| | | | | α1 | α2 | β | γ |
| 1 | 5 | 10 | | 40.0 | 6.0 | 12.7 | 27.2 |
| 2 | 5 | 15 | | | | 30.6 | 69.4 |
| 3 | 5 | 20 | | | | 2.5 | 97.5 |

The fraction in flask No. 3 thus contained virtually pure gamma-globulin.

Substantially the same fractionation results were obtained when the other compounds listed in columns 2 and 3 were used in place of the compounds employed in Examples 1, 2 and 3.

While I have illustrated the present invention with the aid of certain specific embodiments, it will readily be apparent to those skilled in the art that the invention is not limited to these embodiments and that various changes and modifications may be made without departing from the spirit of the invention or the scope of the appended claims.

I claim:
1. The method of fractionating protein solutions of human and animal origin selected from the group consisting of blood serum, ascites and pleural exudate, which comprises adding to the protein solutions a compound having the structural formula

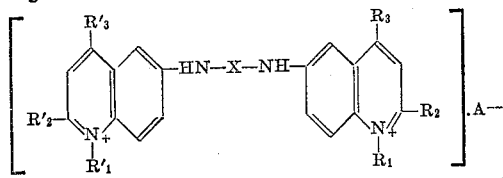

wherein $R_1$, $R_2$, $R_3$, $R'_1$, $R'_2$ and $R'_3$ are selected from the group consisting of hydrogen, lower alkyl, amino and substituted amino, X is a bivalent organic radical selected from the group consisting of —CO—, —CO—CH$_2$—, —CO—CH$_2$—CO— and

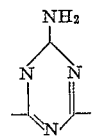

and A is an acid anion, and isolating the soluble protein fractions from the insoluble protein fractions precipitated thereby.

2. The method according to claim 1, wherein the compound having the indicated structural formula is added in the form of an aqueous solution.

3. The method of isolating beta-globulin from human blood serum, which comprises adding to the serum from 32 to 40 parts by volume of a 0.4% by weight aqueous solution of N,N'-di-(2-methyl-4-amino-quinolyl-6)-ureido-dichloromethylate per 10 parts by volume of serum, whereby plasma albumins and plasma globulins other than beta- and gamma-globulin precipitate out, and separating the resulting beta/gamma-globulin solution from the precipitate and isolating the beta-globulin from said beta/gamma-globulin solution by electrophoresis.

4. The method of isolating substantially pure gamma-globulin from human blood serum, which comprises adding to the serum from 32 to 40 parts by volume of a 0.4% by weight aqueous solution of N,N'-di-(2-methyl-4-aminoquinolyl-6)-uredio-dihydrochloride, per 10 parts by volume of serum, whereby plasma albumins and plasma globulins other than gamma-globulin and an insignificant amount of beta-globulin precipitate out, and separating the resulting substantially pure gamma-globulin solution from the precipitate.

5. The method of isolating an albumin-free beta/gamma-globulin fraction from human blood serum, which comprises adding to the serum from 25 to 32 parts by volume of a 0.4% aqueous solution of N,N'-di-(2-methyl-4-aminoquinolyl-6)-ureido-dichloromethylate per 10 parts by volume of serum, whereby plasma albumins and plasma globulins other than beta- and gamma-globulins precipitate out, and separating the resulting beta/gamma-globulin solution from the precipitate.

6. The method of isolating an albumin-free beta/gamma-globulin fraction from human blood serum, which comprises adding to the serum from 25 to 32 parts by volume of a 0.4% aqueous solution of N,N'-di-(2-methyl-4-aminoquinolyl-6)-ureido-dihydrochloride per 10 parts by volume of serum, whereby plasma albumins and plasma globulins other than beta- and gamma-globulins precipitate out, and separating the resulting beta/gamma-globulin solution from the precipitate.

7. The method of isolating a globulin mixture consisting of a major portion of gamma-globulin and a minor portion of beta-globulin from human blood serum, which comprises adding to the serum from 30 to 40 parts by volume of 0.3% aqueous solution of N,N'-di-(2-methyl-4-amino-quinolyl-6)-aminoacetic acid amide-dihydrochloride per 10 parts by volume of serum, whereby plasma albumins, alpha 1-globulin, alpha 2-globulin and the major portion of beta-globulin precipitate out, and separating the resulting globulin solution from the precipitate.

References Cited in the file of this patent
UNITED STATES PATENTS 2,469,193 Cohn _____ May 3, 1949

OTHER REFERENCES

Menkin, V.: "Isolation and Properties of Factor, Responsible for Increased Capillary Permeability in Inflammation," Proc. Soc. Exper. Biol. Med. 36, 1964 (1937).

Menkin, V.: "Presence of Leucocytosis-Promoting Factor in Inflammatory Exudates," Science 90, 237 (1939).

Menkin, V.: "Studies and Isolation of Factor Responsible for Tissue Injury in Inflammation," Science 97, 165 (1943).

Menkin, V.: "Significance of Biochemical Units in Inflammatory Exudates," Science 101, 422 (1943).

Menkin, V.: "Leucopenic Factor in Exudates," Arch. Pathol. 42, 154 (1946).

Menkin, V.: "Chemical Fractionation From Exudates of Factor Promoting Leucocytosis," Am. J. Med. Sci. 205, 363 (1943).

UNITED STATES PATENT OFFICE
CERTIFICATE OF CORRECTION

Patent No. 3,074,851  January 22, 1963

Maximilian Knedel

It is hereby certified that error appears in the above numbered patent requiring correction and that the said Letters Patent should read as corrected below.

Column 4, line 21, for "in", first occurrence, read -- an --; column 6, lines 42 to 48, the formula should appear as shown below instead of as in the patent:

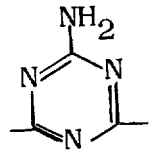

Signed and sealed this 20th day of August 1963.

(SEAL)
Attest:

ERNEST W. SWIDER
Attesting Officer

DAVID L. LADD
Commissioner of Patents